United States Patent
Ng

(10) Patent No.: US 10,405,522 B2
(45) Date of Patent: Sep. 10, 2019

(54) MULTI-COMPONENT REVERSIBLE ANIMAL WASTE BAG

(71) Applicant: SIR Design LLC, Flushing, NY (US)

(72) Inventor: Mun Jen Ng, Flushing, NY (US)

(73) Assignee: SIR Design LLC, Flushing, NY (US)

(*) Notice: Subject to any disclaimer, the term of this patent is extended or adjusted under 35 U.S.C. 154(b) by 0 days.

(21) Appl. No.: 16/051,153

(22) Filed: Jul. 31, 2018

(65) Prior Publication Data

US 2019/0037808 A1 Feb. 7, 2019

Related U.S. Application Data

(60) Provisional application No. 62/540,161, filed on Aug. 2, 2017.

(51) Int. Cl.
*A01K 23/00* (2006.01)
*B65D 33/00* (2006.01)
*E01H 1/12* (2006.01)

(52) U.S. Cl.
CPC .......... *A01K 23/005* (2013.01); *B65D 33/008* (2013.01); *E01H 2001/124* (2013.01)

(58) Field of Classification Search
CPC ...... E01H 2001/124; E01H 2001/1286; E01H 1/1206; A01K 1/01; A01K 23/005; B65D 33/008

USPC ................................................ 294/1.3; 2/158
See application file for complete search history.

(56) References Cited

U.S. PATENT DOCUMENTS

| | | | |
|---|---|---|---|
| 4,275,812 A * | 6/1981 | Poncy .................... | A61B 42/40 128/856 |
| 4,915,226 A * | 4/1990 | Keenan ................. | A61F 15/001 2/168 |
| 5,222,777 A * | 6/1993 | Clonch ................. | E01H 1/1206 294/1.3 |
| 5,301,806 A * | 4/1994 | Olson ................ | A41D 19/0068 15/227 |
| 6,250,829 B1 * | 6/2001 | Brower ................. | A45D 34/04 15/227 |
| 6,315,696 B1 * | 11/2001 | Garrioch ................ | A61H 23/04 482/44 |
| 6,539,549 B1 * | 4/2003 | Peters, Jr. .......... | A41D 19/0075 15/227 |
| 2013/0223970 A1 * | 8/2013 | Surber ................. | E01H 1/1206 414/800 |

* cited by examiner

*Primary Examiner* — Stephen A Vu
(74) *Attorney, Agent, or Firm* — Brett A. Schenck

(57) ABSTRACT

An animal waste bag includes a central pouch and one or more additional pouches formed exterior to the central pouch such that each additional pouch is successively exterior to the preceding pouch. The central and additional pouches are configured to successively retrieve and contain animal waste via their respective successive inversion.

20 Claims, 27 Drawing Sheets

SECTION A-A

SECTION H-H

SECTION 1-1

SECTION B-B

SECTION F-F

SECTION C-C

SECTION D-D

SECTION G-G

SECTION J-J

MULTI-COMPONENT REVERSIBLE ANIMAL WASTE BAG

CROSS REFERENCE TO RELATED APPLICATIONS

This application claims priority to Application No. 62/540,161, filed on Aug. 2, 2017, the entire contents of which are hereby expressly incorporated by reference herein.

FIELD OF THE INVENTION

The disclosed invention relates to reversible animal waste bags having multiple compartments.

BACKGROUND AND SUMMARY OF THE INVENTION

Animal waste management, particularly the clean-up of animal waste from public and non-public areas such as parks, curbsides, etc., currently involves picking up the animal waste using a single compartment, single-use plastic disposable bag.

However, the need for an animal, e.g., a pet, to relieve itself is often unpredictable. Thus, the number of animal waste bags required to adequately manage animal waste during any given time period (e.g., during a walk or longer journey) may exceed the number of single use bags available.

This can lead to frustration, embarrassment, and violating local pet curbing laws, if animal waste is left unattended. Unsanitary improvisation efforts to clean up the animal waste may also result. This risk and challenge is compounded when one owns multiple dogs.

On the other hand, it is inconvenient to carry more waste bags than absolutely necessary in anticipation of avoiding this need.

Single-use disposable animal waste bags also raise concerns for the environment, as landfills take on millions of pounds of plastic from single use animal waste bags every year.

Multi-compartment animal waste bags are therefore described herein, which multi-compartment animal waste bags provide advantages over conventional single-use animal waste bags.

The multi-compartment animal waste bag allows for the retrieval and storage of multiple pet wastes in separate compartments or pouches formed of separate walls of flexible material bonded together along respective edges. The respective walls are bonded together to form the separate compartments, each having an opening defined by the bonded edges. The edges may be sealed, folded or otherwise enclosed to prevent waste material to flow between compartments. In operation, after one compartment is inverted during waste retrieval, the additional compartments may be used for further waste retrieval.

The several walls of the animal waste bag may be formed of flexible material, such as but not limited to high or low density Polyethylene, polypropylene, Bio-degradable and compostable plastics, corn, vegetable, wheat and plant starches, partially or wholly recycled material, resin, metal composite petroleum films, polyvinyl alcohol, polyvinyl, silicone, paper, paper composites with synthetic fibers and the like.

First and second walls of material may be formed in substantially rectangular, curved or polygonal shape, and may be sealed at respective peripheral edges, leaving an edge unsealed or otherwise open so as to create an open pocket. Another wall of material may be similarly formed and bonded to an adjacent wall of material at the perimeter edges so as to form a second open pocket. Further compartments may be similarly formed. Each wall of material that is added may be successively lower in height than the previous wall to which it is bonded.

In operation, a user inserts his/her hand into an unused open pocket of the animal waste bag, and, using the walls of material as a protective barrier, the user retrieves the animal waste material, inverting the pocket being used so as to deposit the waste material therein. After inversion, another unused open pocket is available for the user to retrieve a second animal waste material. To retrieve the second waste material, the user inserts his/her hand into another unused open pocket, and, using the walls of material as a protective barrier, the user retrieves the animal waste material, inverting the pocket being used so as to deposit the waste material therein.

The animal waste bag may be made as a singular unit or as multiple units attached adjacent to one another and perforated to allow for detachment. The animal waste bag accordingly may be folded and rolled unto itself or a spindle.

Other features and advantages of the present invention will become apparent from the following more detailed description, taken in conjunction with the accompanying drawings, which illustrate, by way of example, the principles of the presently described embodiments.

BRIEF DESCRIPTION OF THE DRAWINGS

FIGS. 3A-3J are perspective views of the animal waste bag in use according to at least one embodiment of the present invention;

DETAILED DESCRIPTION OF THE DRAWINGS

Figure 1:
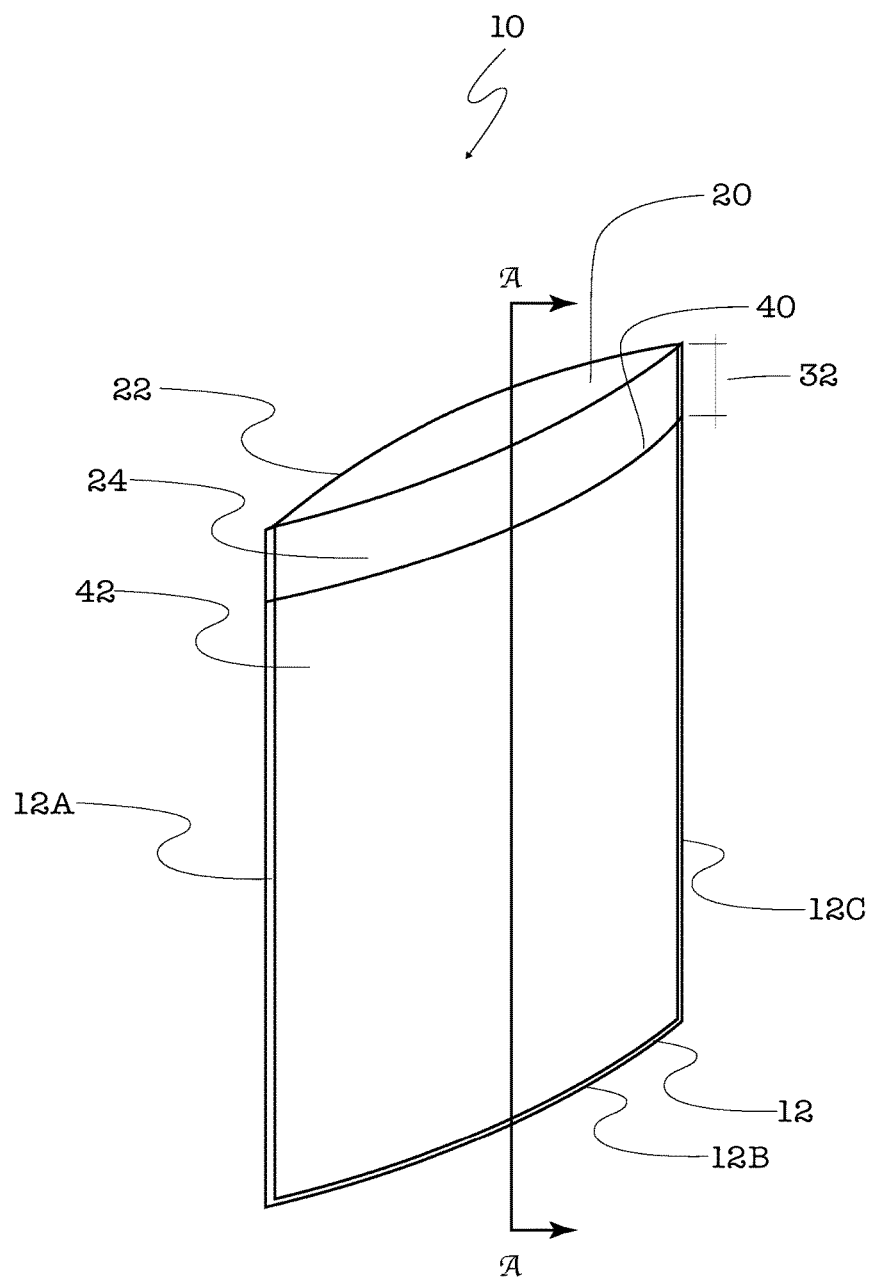
FIG. 1 is a perspective view of an animal waste bag according to at least one embodiment of the present invention.

The above described drawing figures illustrate the disclosed invention in at least one of its preferred, best mode embodiment, which is further defined in detail in the following description. Those having ordinary skill in the art may be able to make alterations and modifications to what is described herein without departing from its spirit and scope. While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspects of the invention to any embodiment illustrated. Therefore, it should be understood that what is illustrated is set forth only for the purposes of example and should not be taken as a limitation on the scope of the disclosed invention.

Referring to the Figures, an animal waste bag 10 comprises a central pouch 20 and at least one additional pouch 40. The pouches are arranged such that each such additional pouch is successively exterior to the pouch preceding it, in a direction beginning with the central pouch and proceeding outward.

There may be a predetermined height differential 32 between the respective openings of the central pouch and one or more additional pouches, and/or between successive additional pouches. This height differential allows for easy identification of unused pouches, and facilitates hand insertion therein. Forces such as static electricity and other similar forces that cause the walls to adhere together can therefore be dealt with more efficiently via the height differential. The height differential is preferably from approximately 1 cm to 10 cm, and more preferably from approximately 1 cm to 5 cm.

Each pouch is preferably formed of respective walls of flexible material, preferably: high or low density polyethylene, polypropylene, Polyvinylidene chloride, bio-degradable starch or vegetable based composites, metal composite petroleum films, polyvinyl alcohol, vinyl, paper, paper and or natural or synthetic fiber composites, recycled paper or paper pulp and the like. The thickness of the walls is preferably between 1 mils and 6 mils, but may be of any thickness that permits the functionality described herein.

FIG. 1 illustrates the animal waste bag having the central pouch, and a single additional pouch. The pouches are formed via a sequence of bonded walls. A first wall 22 is bonded to a second wall 24 at respective peripheries so as to form a peripheral bond 12. The walls may be bonded at respective left edges 12A, right edges 12C and bottom edges 12B so as to form the peripheral bond. A third wall 42 is similarly bonded to the second wall. The third wall may be of shorter height than the first and/or second walls, in accordance with a first height differential 32, preferably from approximately 1 cm to 10 cm.

The walls may be bonded via heat sealing, sonic welding, die cut heat seal, compression bonding or welding, heat transfer, epoxy or gluing, or mechanical bonding. Preferably, the width of the peripheral bond is approximately from 0.01 mm to 2.00 mm.

In some embodiments, the animal waste bag comprises a continuous sheet of material that has been folded upon itself (or multiple sheets of material stacked) so as to form the respective walls, which are then heat sealed and die cut at the respective edges so as to form the peripheral bond. Material may then be removed, if necessary, to form the central pouch and/or one or more of the at least one additional pouch. In some embodiments, the sheet of material may comprise a tube of blown plastic film that has been rolled flat.

Figure 2:
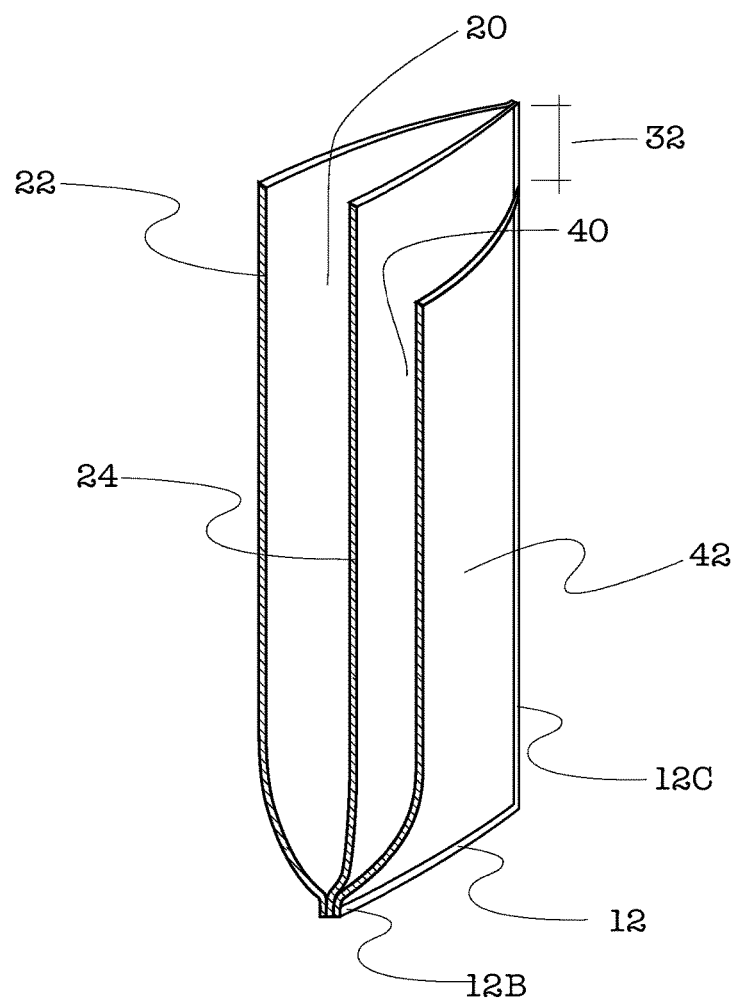
FIG. 2 is a cross-sectional view of the animal waste bag according to at least one embodiment of the present invention.

FIG. 2 is a perspective view of cross section A-A notated in illustration FIG. 1. As shown, the first wall, the second wall and the third wall are bonded together via the peripheral bond. The central pouch and the additional pouch having respective openings are thereby defined. In other words, the first wall and the second wall are joined via peripheral bond to define the central pouch, while the second wall and the third wall are joined via peripheral bond to define the additional pouch.

The sharing of walls between pouches helps conserve resources, as the inventive animal waste bag uses less material than a comparable number of single-use bags. For example, a two-compartment animal waste bag in accordance with the disclosed embodiments uses approximately 25% less material than two single-use bags.

Referring now to FIGS. 3A-J, an exemplary use of the animal waste bag to retrieve animal waste material 16 in accordance with at least one embodiment will be described.

Figure 3A:
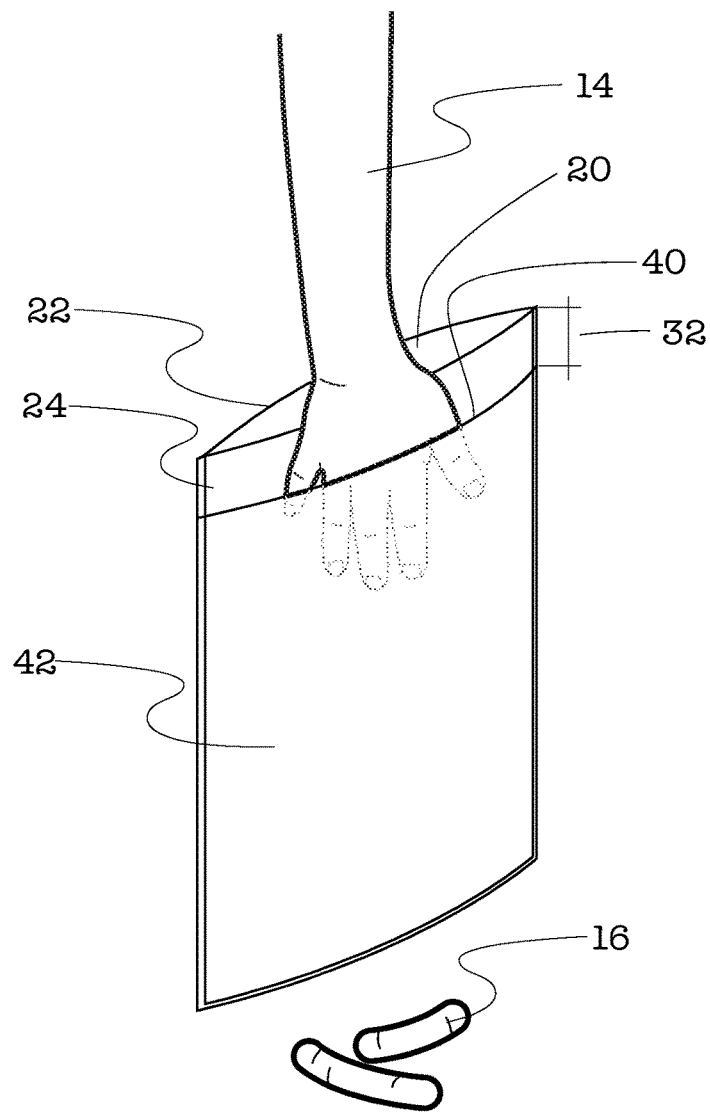
Figure 3B:
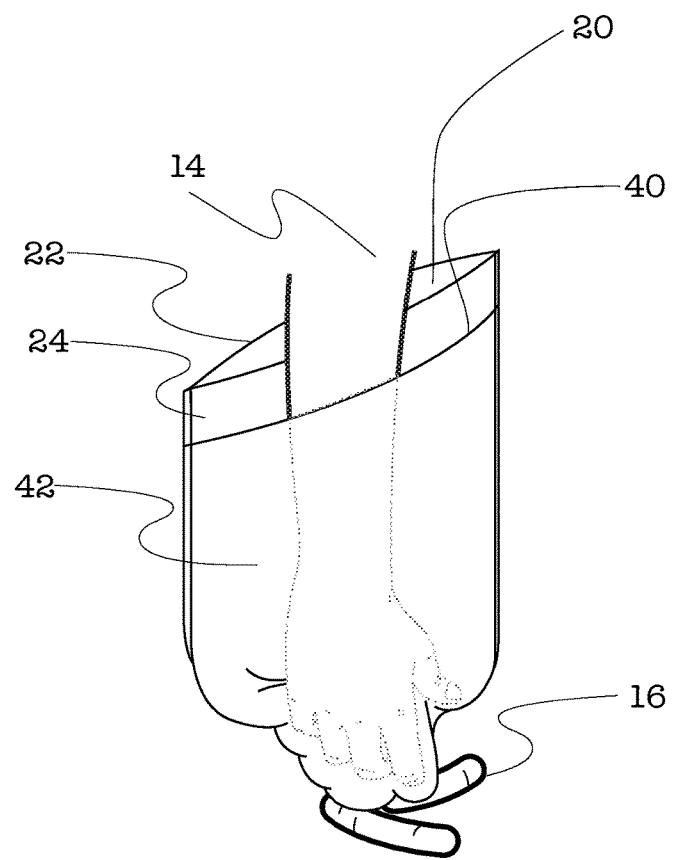
Figure 3C:
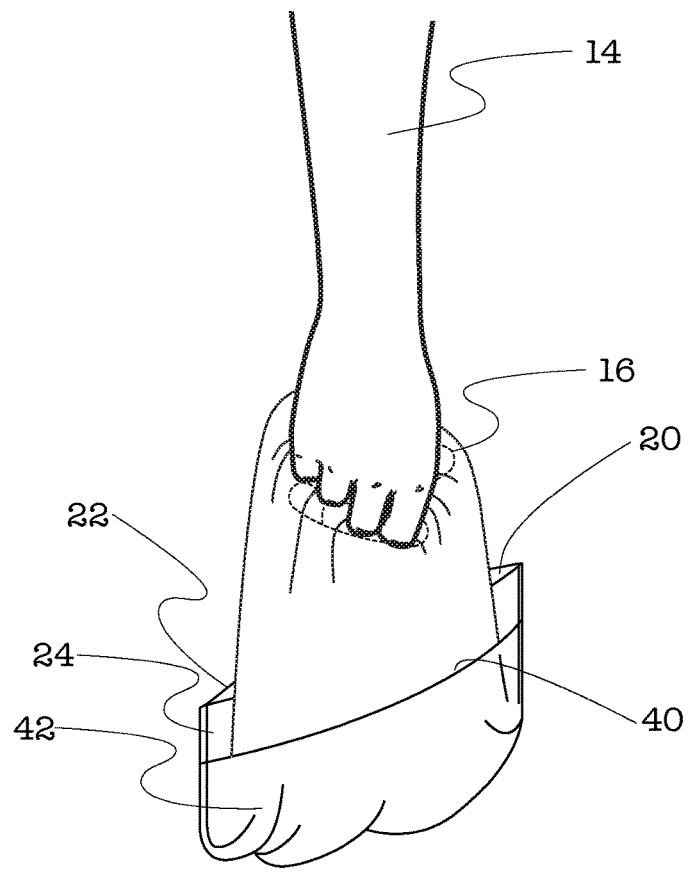
Figure 3D:
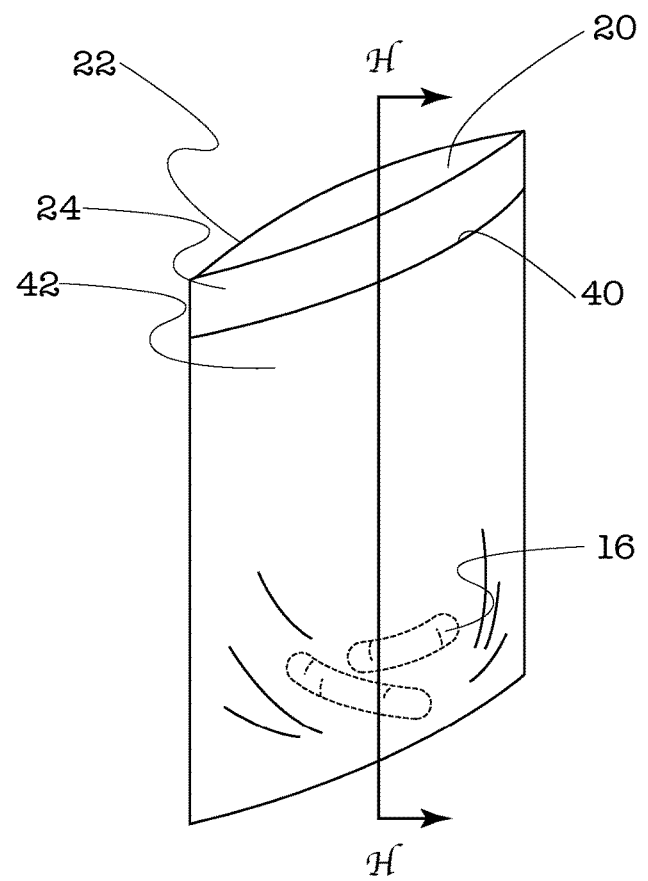
Figure 3E:
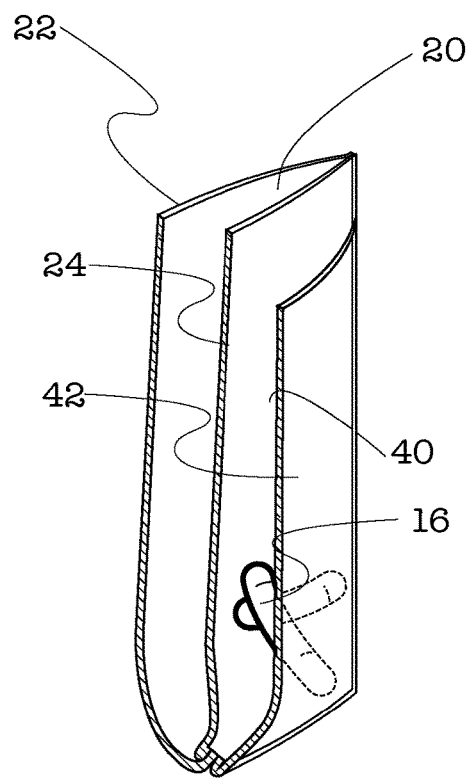

A user inserts his/her hand 14 into the additional pouch via its opening (FIG. 3A). Using the second wall and the third wall as a protective shield, the user retrieves the animal waste material by deforming the walls to encompass the animal waste material (FIG. 3B). Retaining the animal waste material within the confines of the second and third walls, the user inverts the additional pouch (FIG. 3C). The inverted additional pouch thereby contains the animal waste material, leaving the central pouch unused and available for retrieving additional animal waste material (FIG. 3D-3E).

Figure 3F:
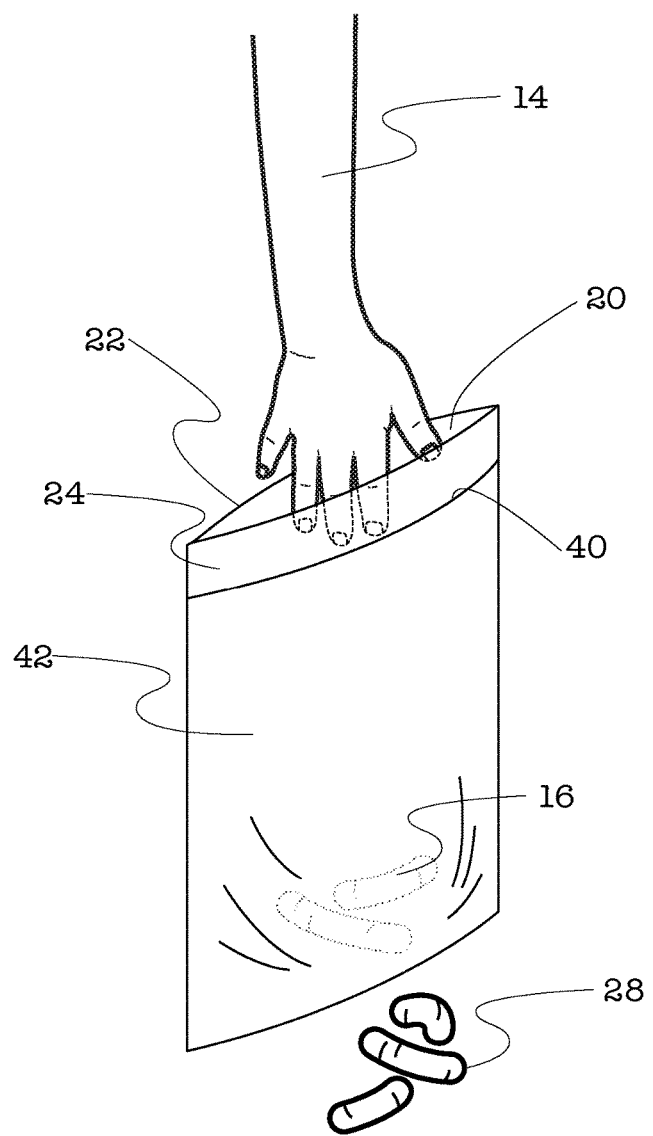

To retrieve the additional animal waste material, the user inserts his/her hand into the central pouch via its opening (FIG. 3F). At this phase, animal waste material is contained within the inverted additional pouch, but the user's hand is protected from the animal waste material by the second wall. The additional animal waste material is then retrieved using the central pouch in a similar manner as the additional pouch was used, namely, by inverting the central pouch around the additional animal waste material 28 (FIG. 3D-3I). The inverted central pouch thereby contains the additional animal waste material, while the additional pouch contains the animal waste material (FIG. 3J).

Figure 4:
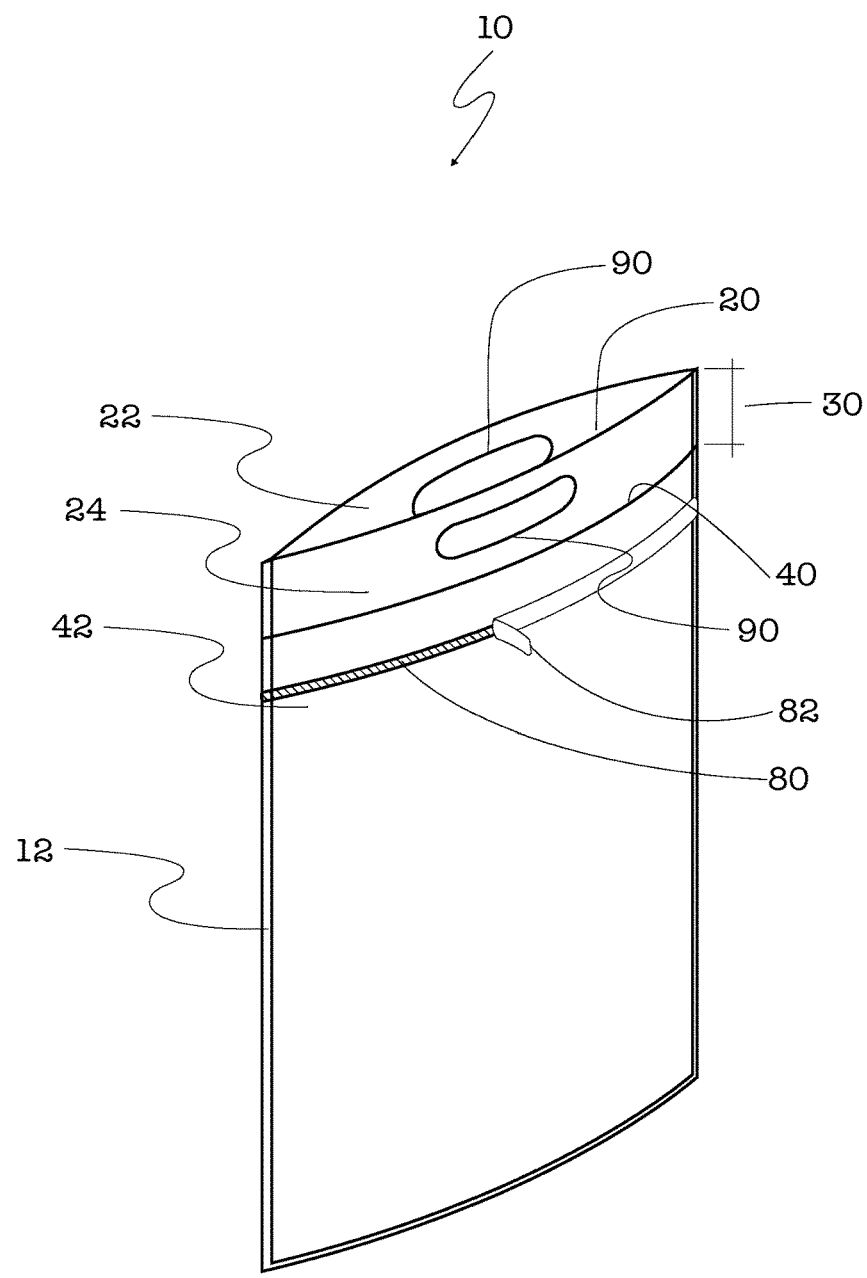
FIG. 4 is a perspective view of the animal waste bag according to at least one embodiment of the present invention.

As shown, for example, in FIG. 4, the animal waste bag may include handles 90 for carrying the animal waste bag.

In some embodiments, the handles may comprise cutouts in the walls of the central pouch. In some embodiments, as shown for example in FIG. 6, the handles may comprise carrying handles jointly extending from the first wall and the second wall, which carrying handles can be used to tie and close the animal waste bag so as to seal in odors and secure waste articles.

Returning to FIG. 4, the animal waste bag may further include one or more adhesive strips 80 configured to seal associated pouches after such pouches have been used, thereby sealing the animal waste material therein. As such, the adhesive strips are preferably located proximal to the respective openings of the associated pouches. The adhesive strips also preferably traverse the openings of their respective associated pouches. The adhesive strips are also preferably located on the side of at least one wall forming the respective associated pouch, such side being the side that, after inversion of the associated pouch, the adhesive strip is operable to adhesively seal the associated pouch.

The adhesive strip may be of any adhesive substance, but is preferably a tacky synthetic or natural glue. A disposable covering 82 may also cover the adhesive strip so as to prevent the adhesive strip from prematurely or inadvertently adhering to the walls, or any other material. The disposable covering may be constructed of paper, plastic sheeting or similar material coated with a layer of wax, non-adhesive, hydrophilic or similar coating. The disposable strip of material is preferably readily uncouplable from the adhesive strip when the need to seal the associated pouch arises, e.g., after retrieving animal waste material in the associated pouch.

For example, as shown in FIG. 4, the adhesive strip is located along the exterior side of the third wall, such that, when the additional pouch is inverted during use, the adhesive strip faces the second wall. The disposable covering may then be removed so that the adhesive strip can couple the third wall to the second wall. This coupling will close the additional pouch securing the animal waste material therein. The user may then proceed to use the central pouch to retrieve the additional animal waste material, as discussed herein.

Figure 16A:
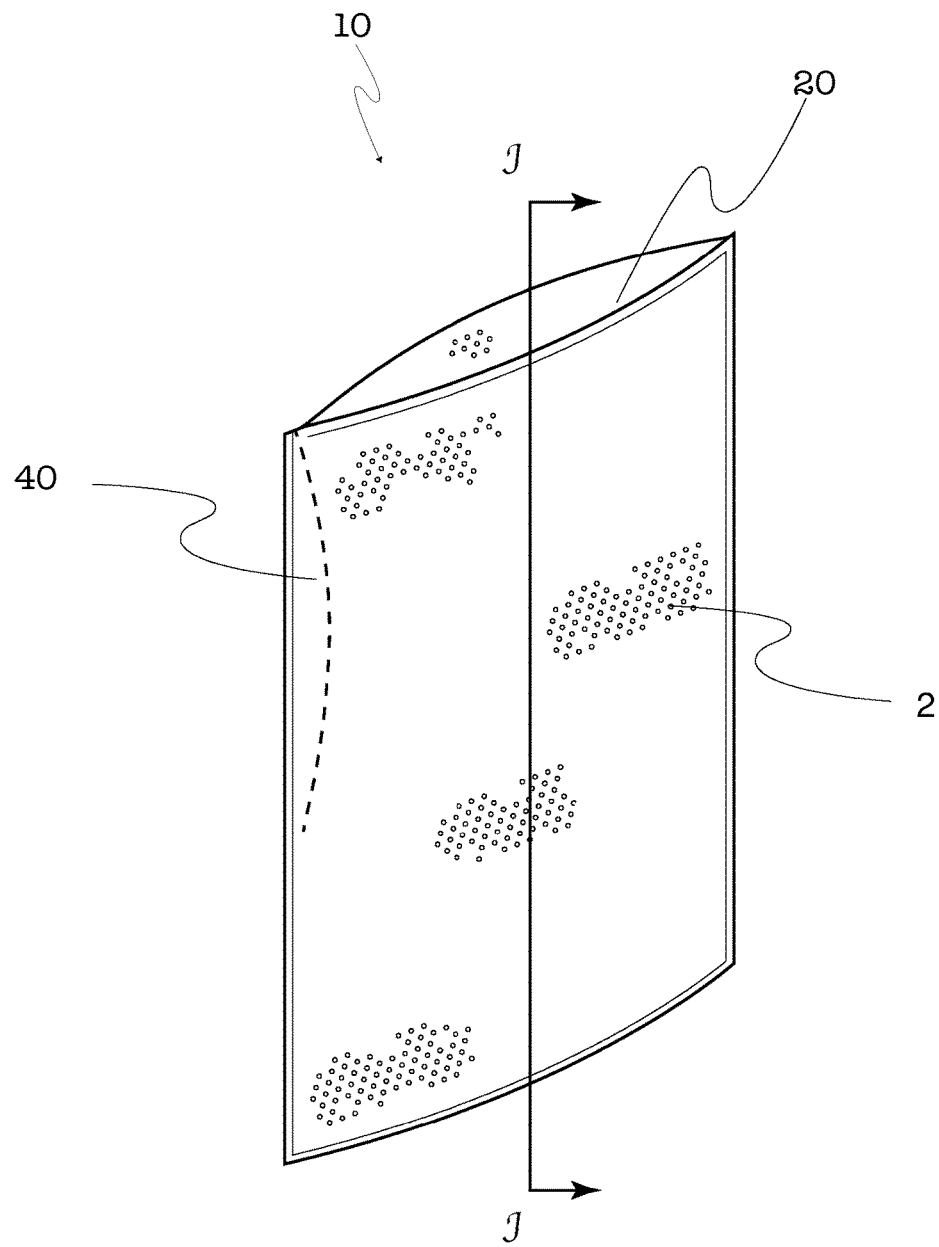
FIG. 16A is a perspective view of the animal waste bag according to at least one embodiment of the present invention.
Figure 16B:
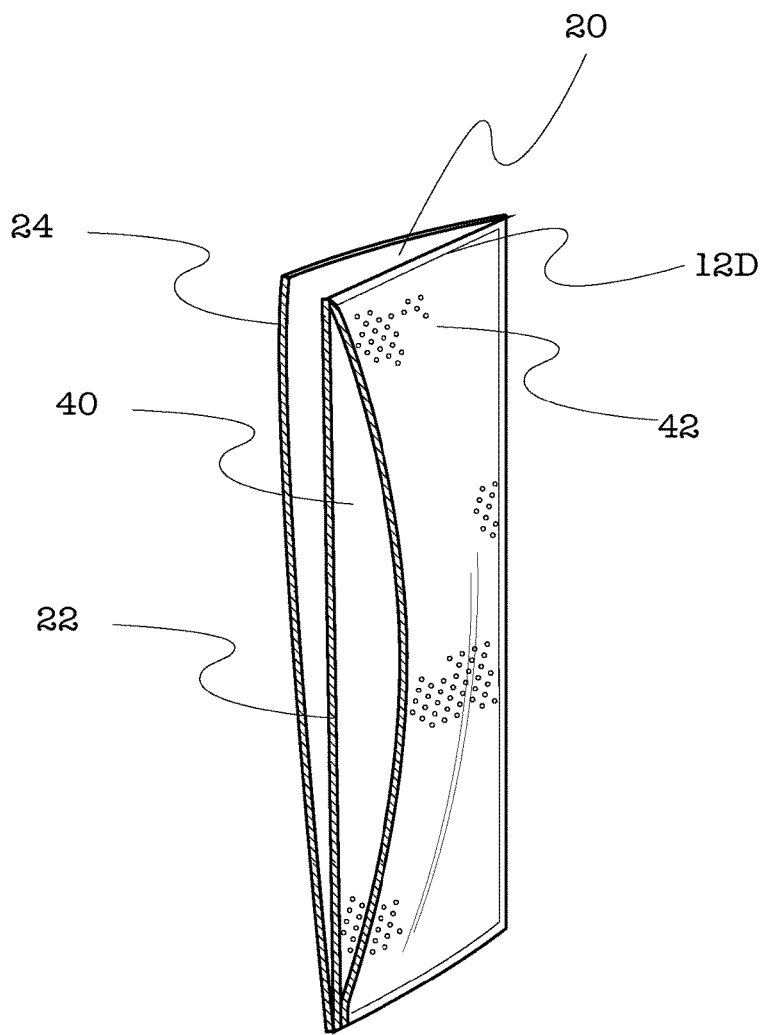
FIG. 16B is a cross-sectional view of the animal waste bag according to at least one embodiment of the present invention.
Figure 16C:
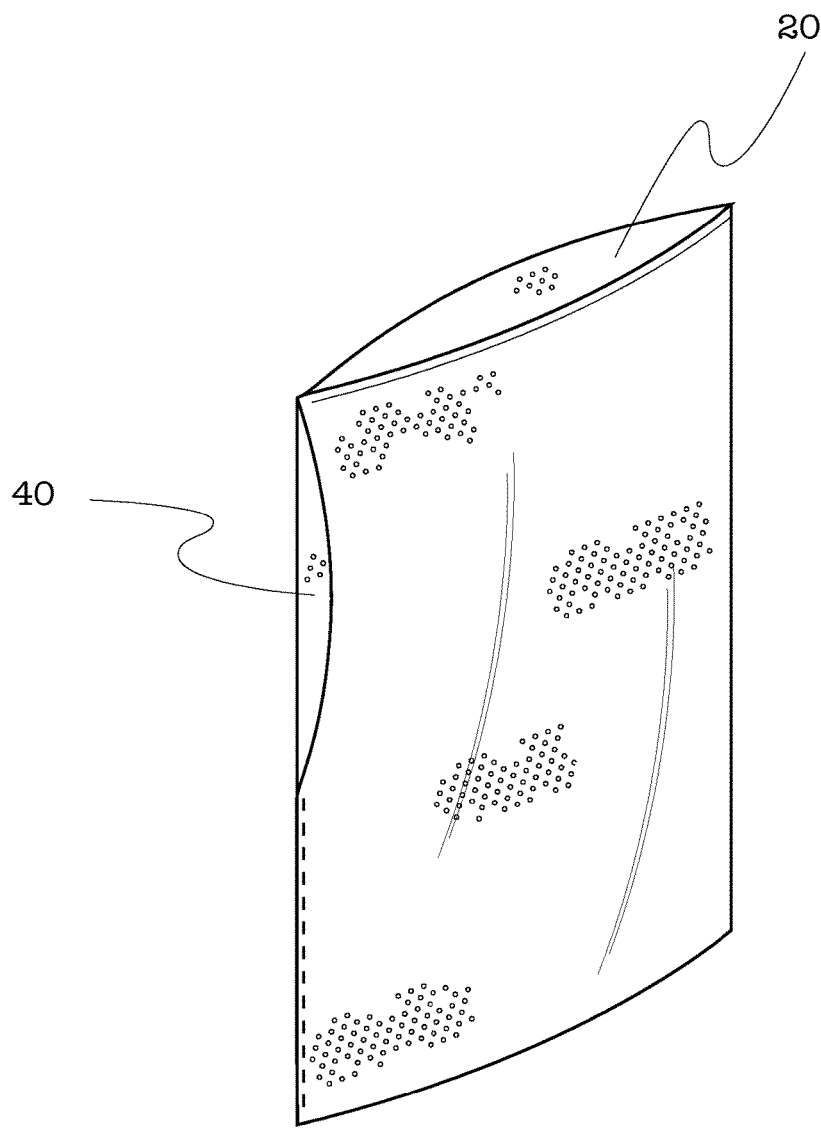
FIG. 16C is a perspective view of the animal waste bag according to at least one embodiment of the present invention.
Figure 3D:
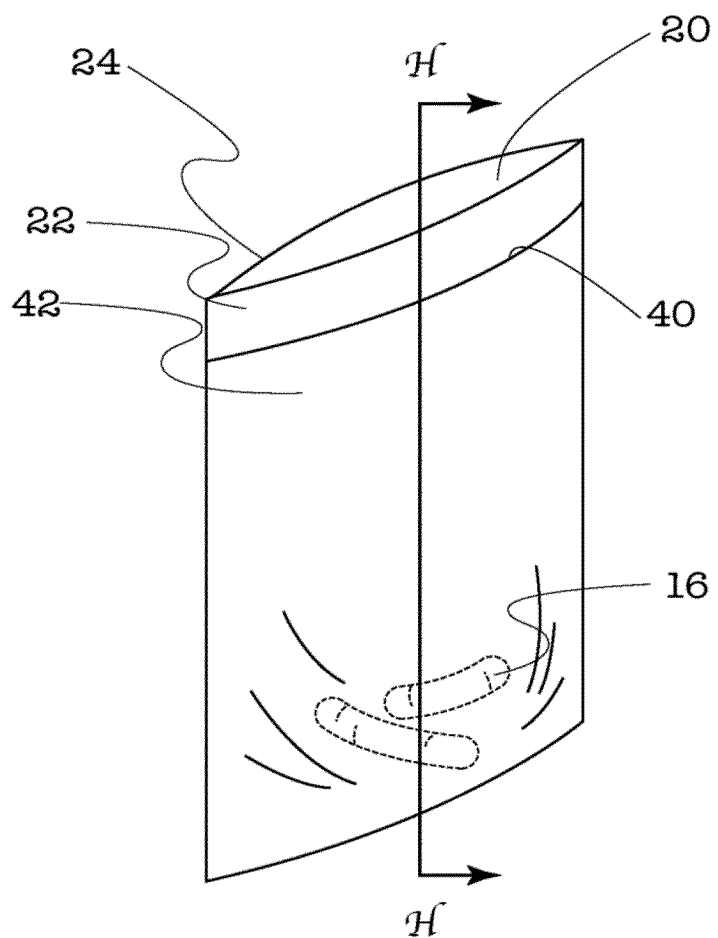
Figure 3E:
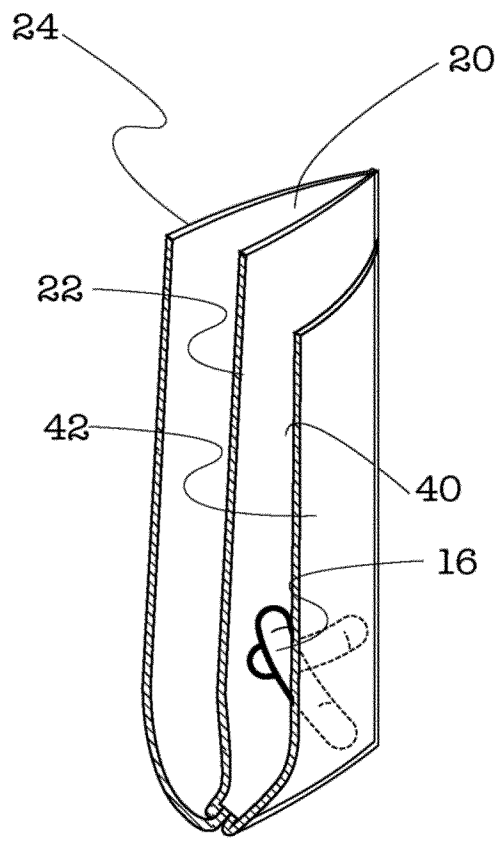
Figure 3F:
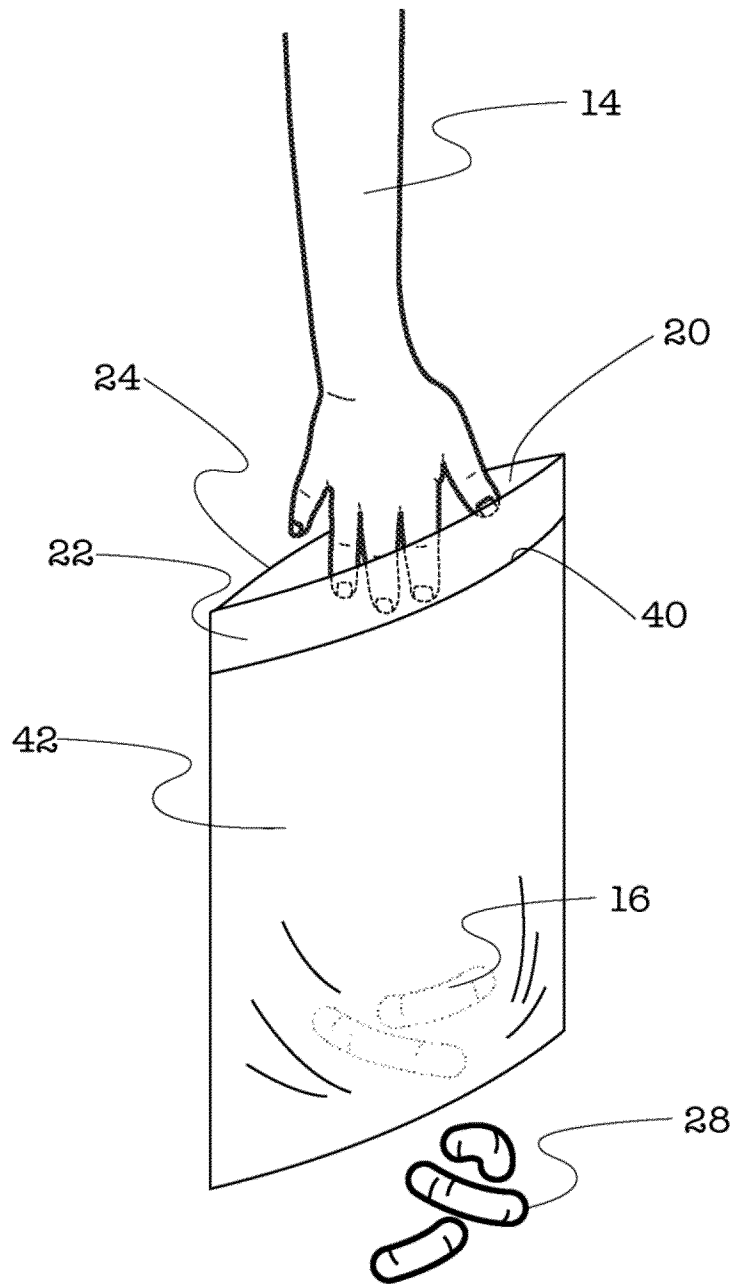
Figure 3G:
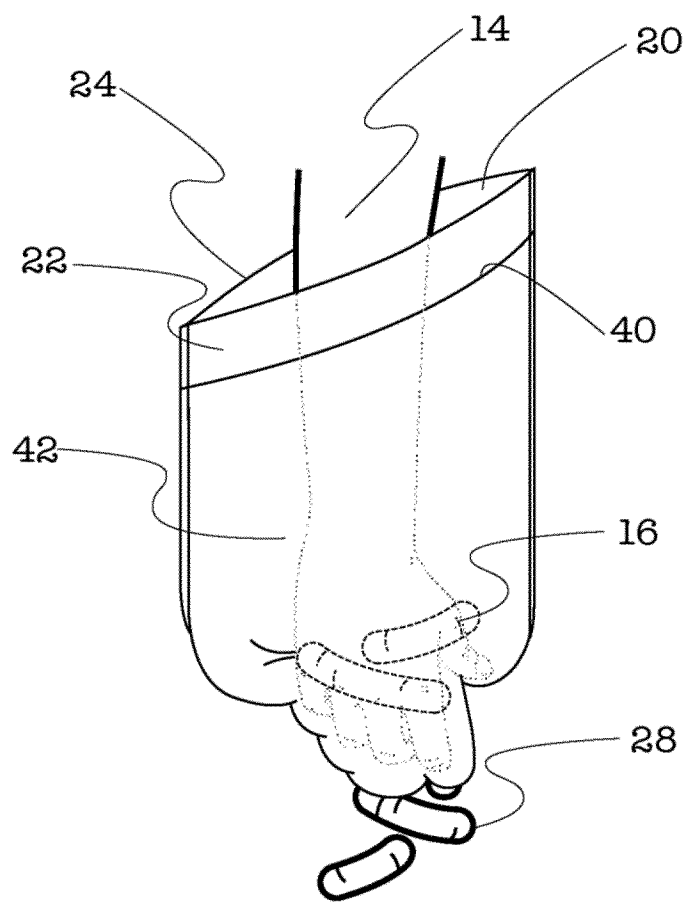
Figure 3H:
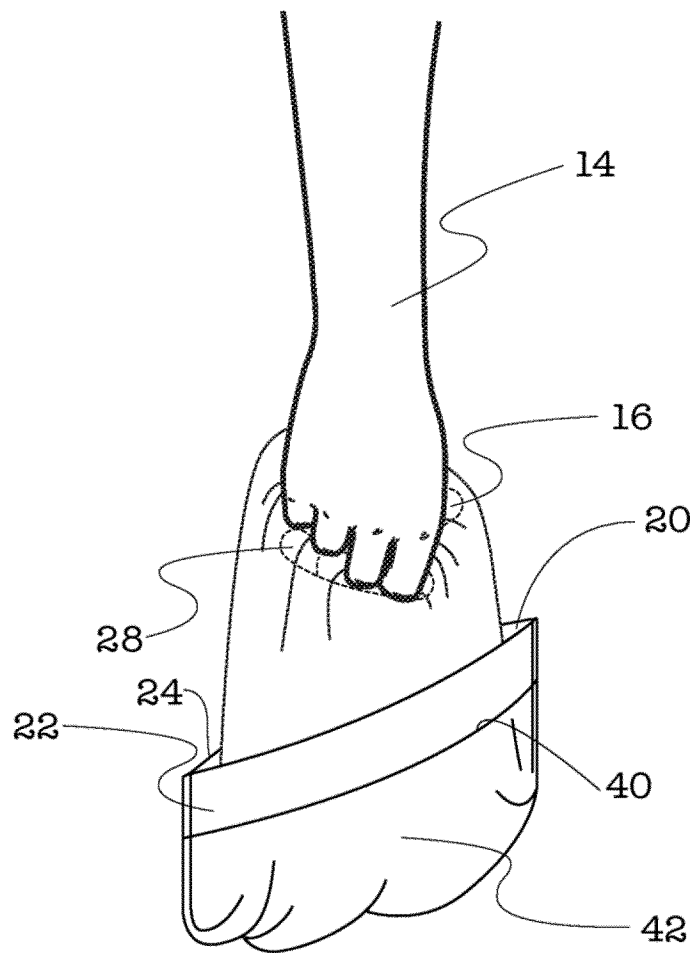
Figure 31:
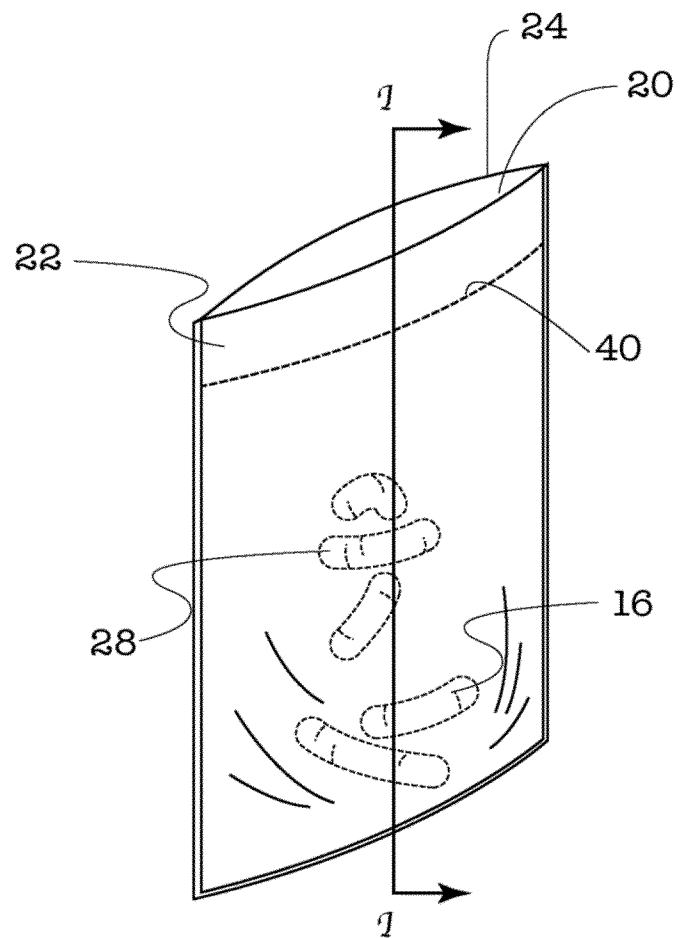
Figure 3J:
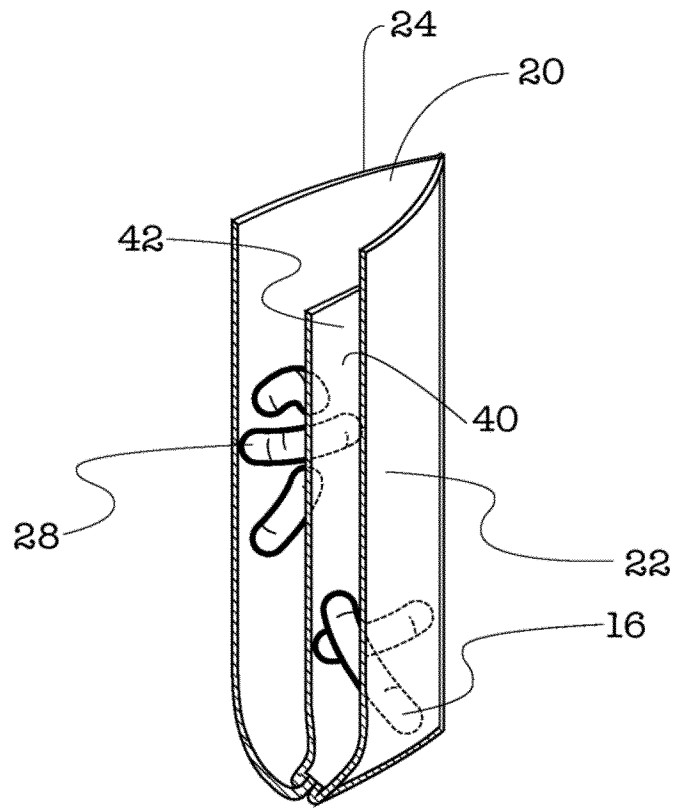

Alternatively, the animal waste bag may be partially or wholly made of textured plastic 2 that may lock and secure the contents when its walls are pressed together. This is shown, for example, in FIG. 16A-C.

Figure 5:
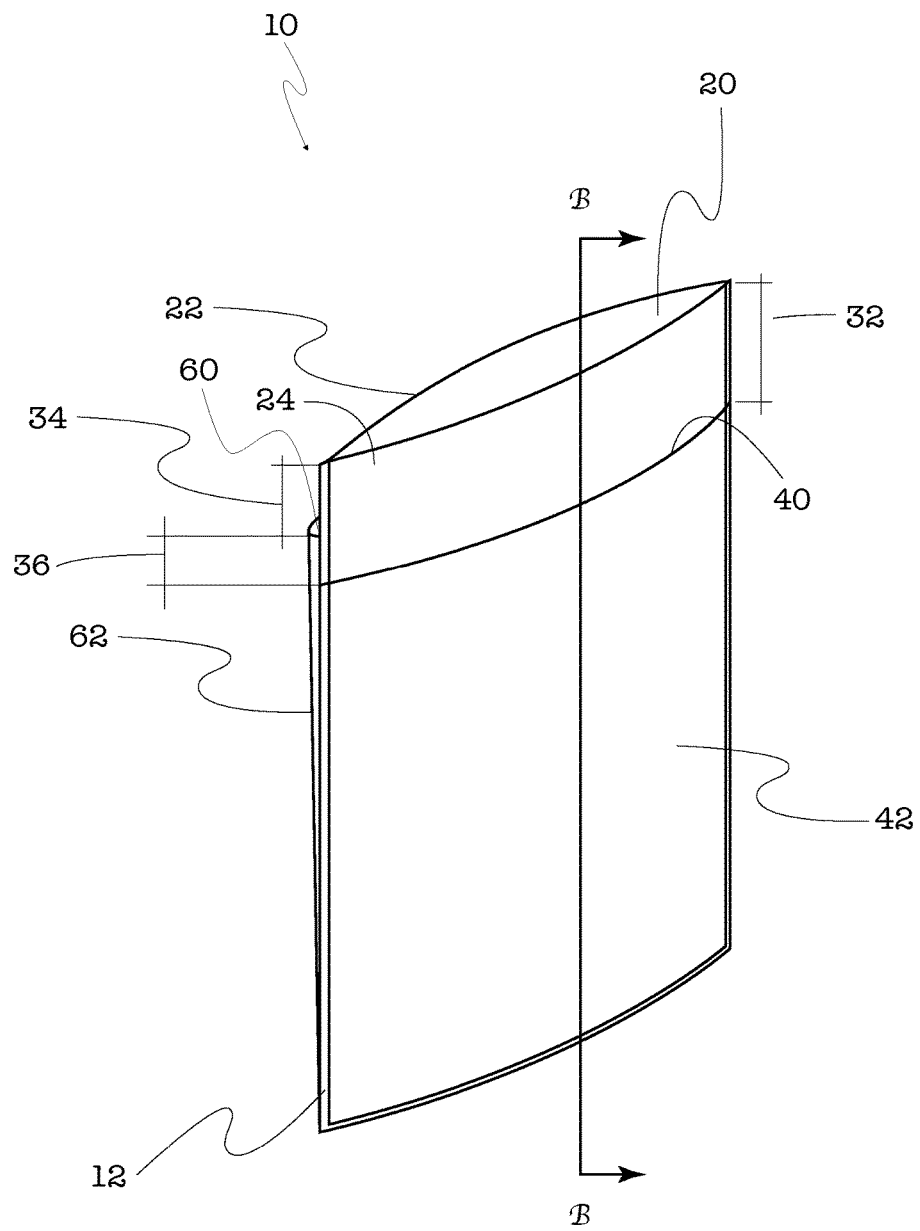
FIG. 5 is a perspective view of the animal waste bag according to at least one embodiment of the present invention.
Figure 6:
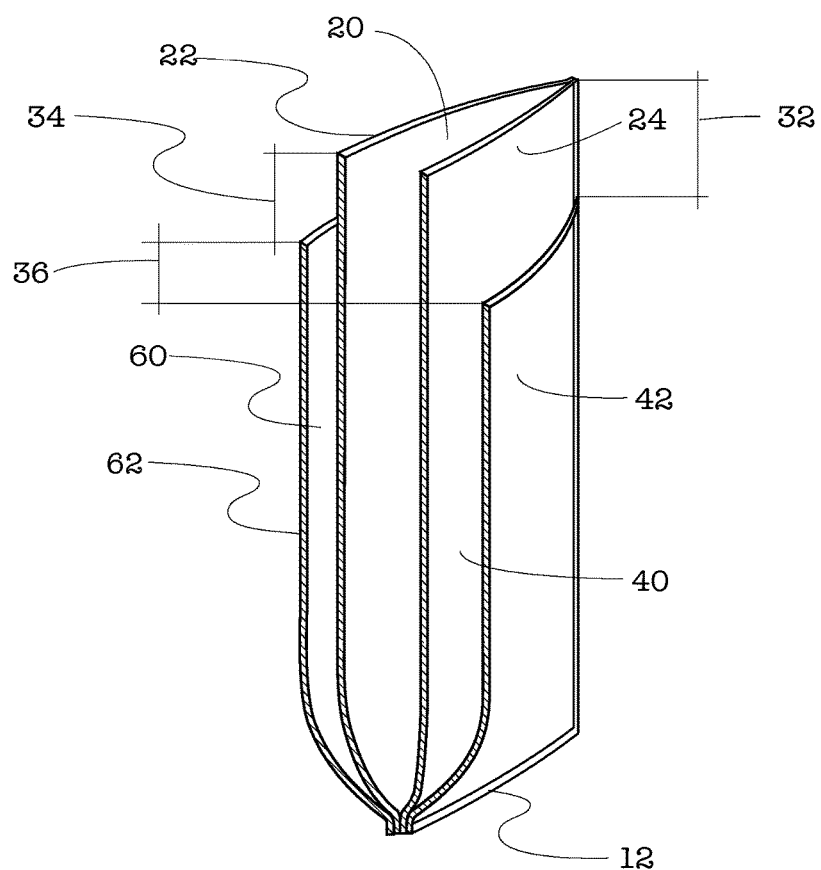
FIG. 6 is a cross-sectional view of the animal waste bag according to at least one embodiment of the present invention.
Figure 7:
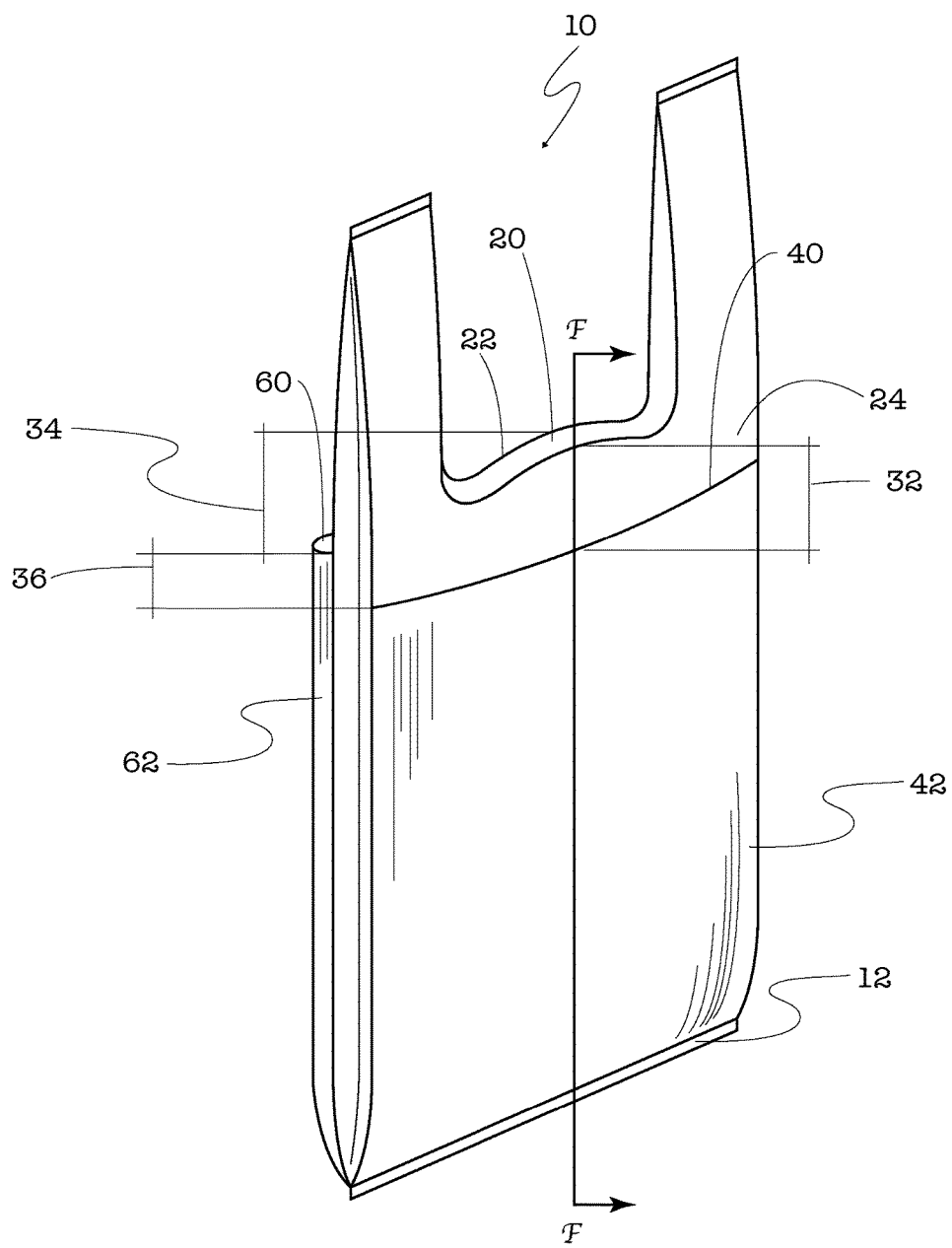
FIG. 7 is a perspective view of the animal waste bag according to at least one embodiment of the present invention.
Figure 8:
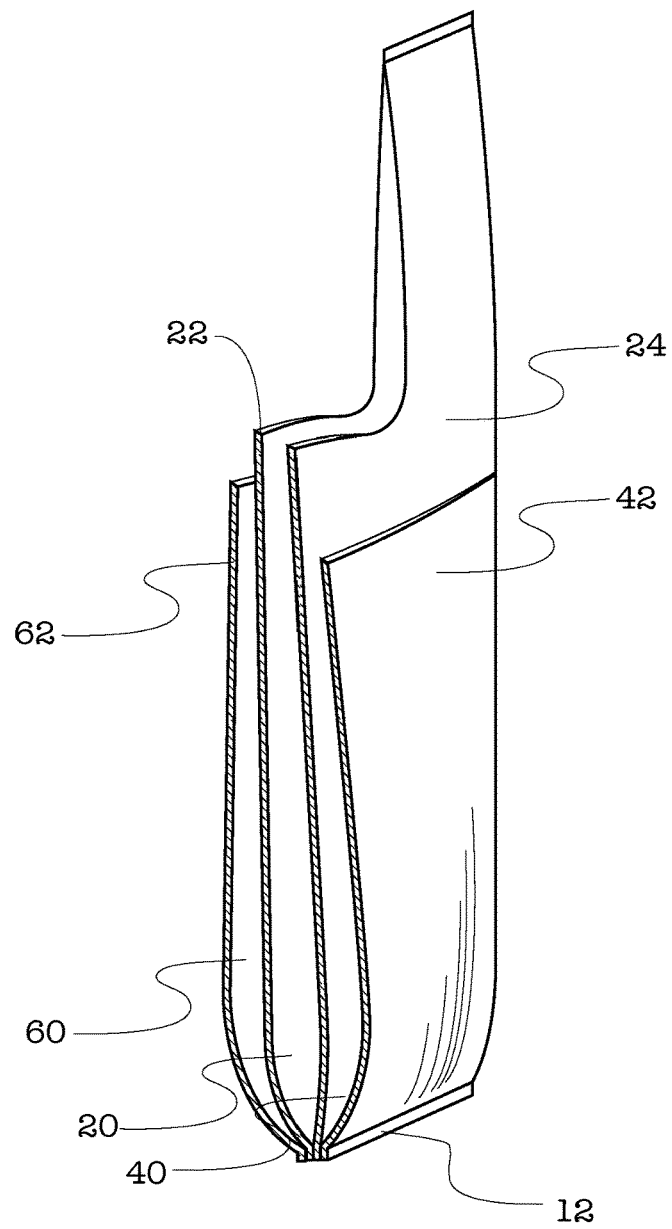
FIG. 8 is a cross-sectional view of the animal waste bag according to at least one embodiment of the present invention.

FIGS. 5-6 illustrate the animal waste bag in accordance with at least one embodiment, in which the at least one additional pouch comprises the additional pouch and a further additional pouch 60. The further additional pouch is formed via a further wall 62 similarly bonded to the first wall at the peripheral bond. Alternatively, or in addition, the further additional pouch, or successive additional pouches may be formed via respective further walls similarly bonded to the third wall, or to each other, in succession.

As shown in FIGS. 5-8, there may be several height differentials between the pouches. The first height differential may exist between the central pouch and the additional pouch, preferably from approximately 1 cm to 10 cm. A second height differential 34 may exist between the central pouch and the further additional pouch, preferably from approximately 0.5 cm to 5 cm. A third height differential 36 may exist between the additional pouch and the further additional pouch, preferably from approximately 0.5 cm to 5 cm. It will be understood, however, that respective height differentials are not necessary, nor are they necessarily unique as between pouches.

The animal waste bag having further additional pouches is operated in accordance with the descriptions herein. That is to say, each successive pouch is inverted to retrieve and contain animal waste therein. Accordingly, successive height differentials are useful for identifying the sequence in which the open pockets should be used to retrieve and contain animal waste material. Referring to the example of FIGS. 5-8 for illustration, by starting with the additional pouch, which has the shortest wall, and then moving onto the further additional pouch, which has the next shortest wall, and so on until the user reaches the central pouch, the user can successfully retrieve and contain separate instances of animal waste material in a systematic, and orderly process while using less material. This also allows for the quick identification of available compartments in limited light situations.

Figure 9:
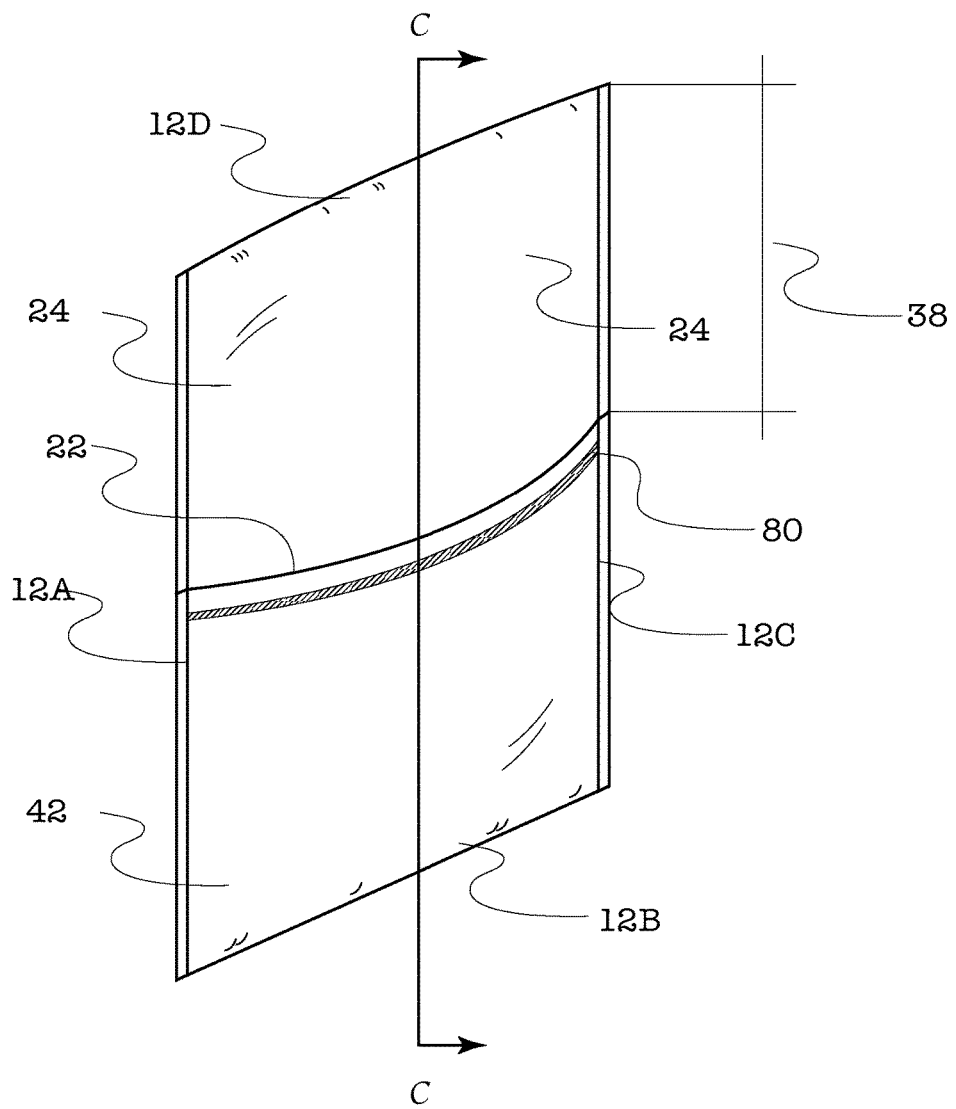
FIG. 9 is a perspective view of the animal waste bag according to at least one embodiment of the present invention.
Figure 10:
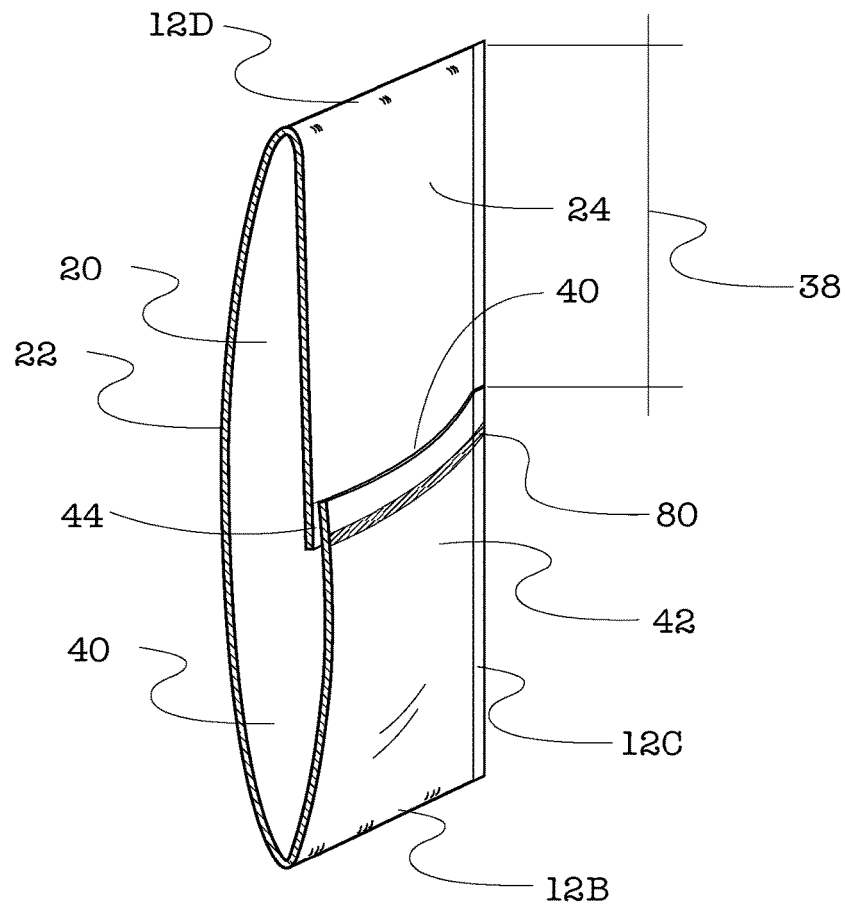
FIG. 10 is a cross-sectional view of the animal waste bag according to at least one embodiment of the present invention.

FIGS. 9-10 illustrate the animal waste bag in accordance with at least one embodiment, in which the respective pouches are formed so as to be inverted with respect to each other, and so as to have respective openings located approximately central to the animal waste bag. By inverting and locating the respective openings of the pouches at the midpoint of the bag, confusion as to which opening the user is inserting their hand may be avoided.

As shown in FIGS. 9-10, the first wall, the second wall, and the third wall are formed from a single sheet of material that has been folded at the bottom edge, joining the first and third walls, and a top edge 12D, joining the first and second walls. The walls are also bonded at respective left edges and right edges. In an alternative to folds, the respective walls may likewise be bonded at the bottom edge and the top edge.

The first wall and the second wall are formed such that they define the central pouch therebetween, whose opening faces downward, whereas the first wall and the third wall are formed such that they define the additional pouch therebetween, whose opening faces upward. The respective openings of the pouches are located approximately central to the animal waste bag, i.e., they are located at approximately half of height of the first wall. Preferably, the respective openings do not deviate from this midline 38 by more than approximately one-third of the height of the first wall.

An overlap 44 may also exist between the second wall and the third wall, which allows for the user to have a clear defined single open pouch in which to insert his/her hand. The edges of the respective openings may also be folded upon themselves again to form a lip that, when inverted, prevents contents from spilling out.

Adhesive strips may also be utilized in accordance with the prior discussion. Alternatively, the animal waste bag may be made of textured plastic that may lock and secure the contents when its walls are pressed together.

In operation, inverting the additional pouch during the retrieval and storage of animal waste material in the additional pouch provides access to the central pouch via the inversion. In other words, the user's hand is inserted into the additional pouch so as to retrieve the animal waste material, invert the additional pouch, and thereby capture the animal waste material in the additional pouch. The adhesive strip may then be utilized to couple the third wall to the first wall. At this point, the opening of the central pouch is more or less exposed due to the inversion of the additional pouch, permitting the user to insert his/her hand into the central pouch so as to retrieve additional animal waste material, invert the central pouch, and thereby capture the additional animal waste material in the central pouch.

Figure 11:
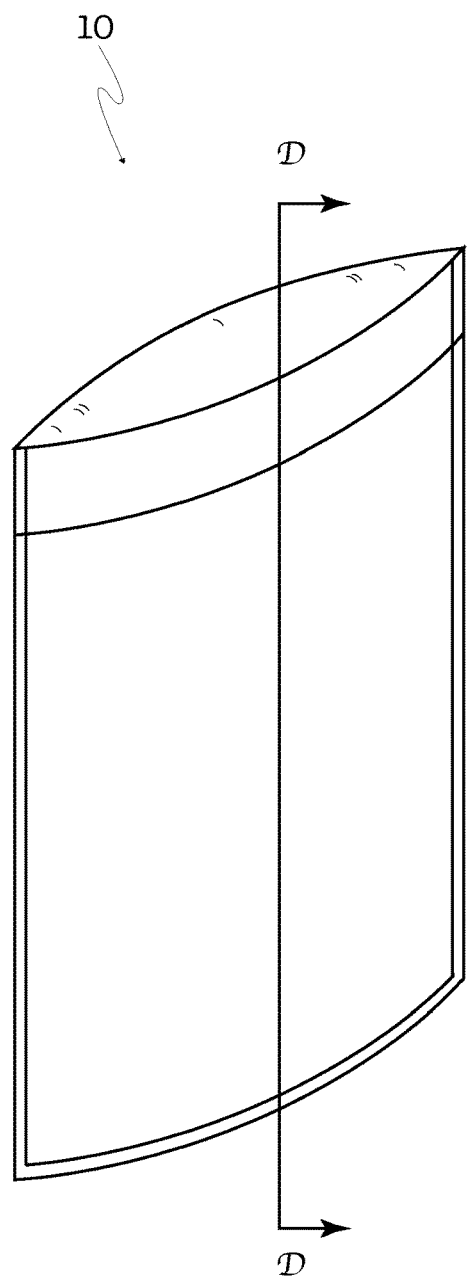
FIG. 11 is a perspective view of the animal waste bag according to at least one embodiment of the present invention.
Figure 12:
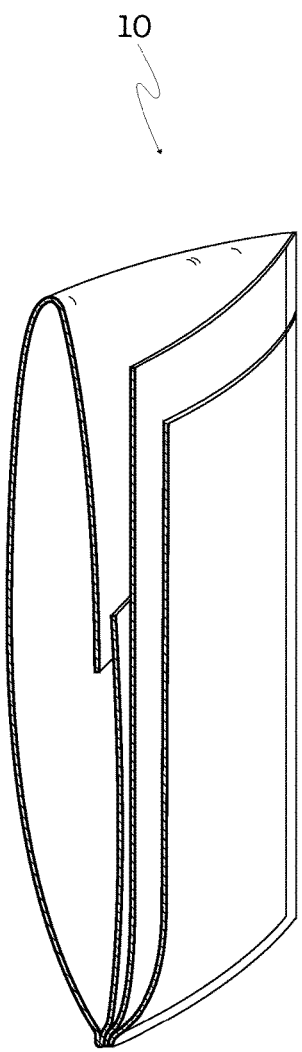
FIG. 12 is a cross-sectional view of the animal waste bag according to at least one embodiment of the present invention.

FIGS. 11-12 illustrate the animal waste bag in accordance with at least one embodiment, in which the pouch features illustrated in FIGS. 1-8 are combined with the pouch features illustrated in FIGS. 9-10. The structure and operation of such embodiments are believed to be apparent from the foregoing discussion, and are not described further here for the sake of brevity.

Figure 13:
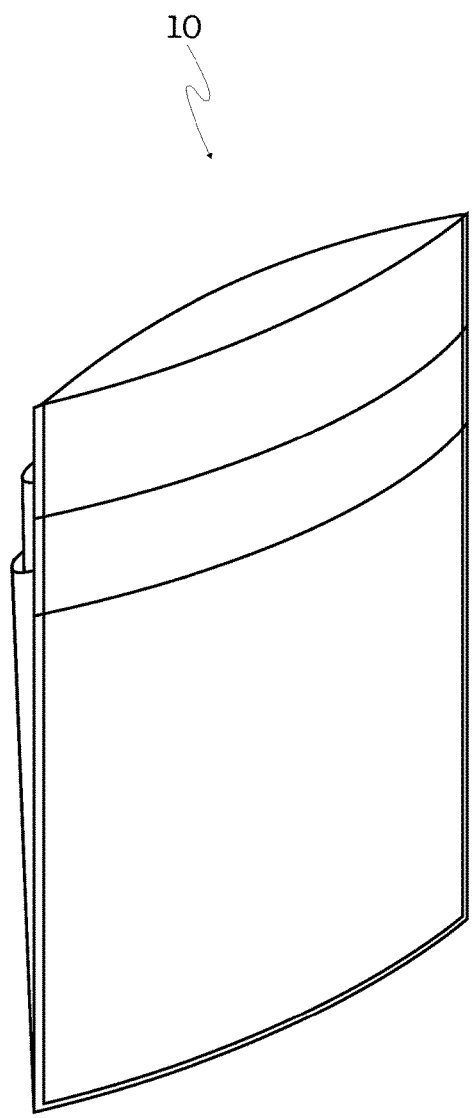
FIG. 13 is a perspective view of the animal waste bag according to at least one embodiment of the present invention.

FIG. 13 illustrates the animal waste bag in accordance with at least one embodiment, in which five pouches are formed in accordance with the pouch features illustrated in FIGS. 1-8. Accordingly, FIG. 13 is illustrative of a plurality of additional pouches formed by adding successive walls of material to form successive additional pouches such that each such additional pouch is successively exterior to the pouch preceding it, in a direction beginning with the central pouch and proceeding outward. Any number of additional pouches may be added without departing from the scope of the invention. FIG. 13 also illustrates how successive height differentials aid in the ease of use. The structure and operation of such embodiments are believed to be apparent from the foregoing discussion, and are not described further here for the sake of brevity.

Figure 14:
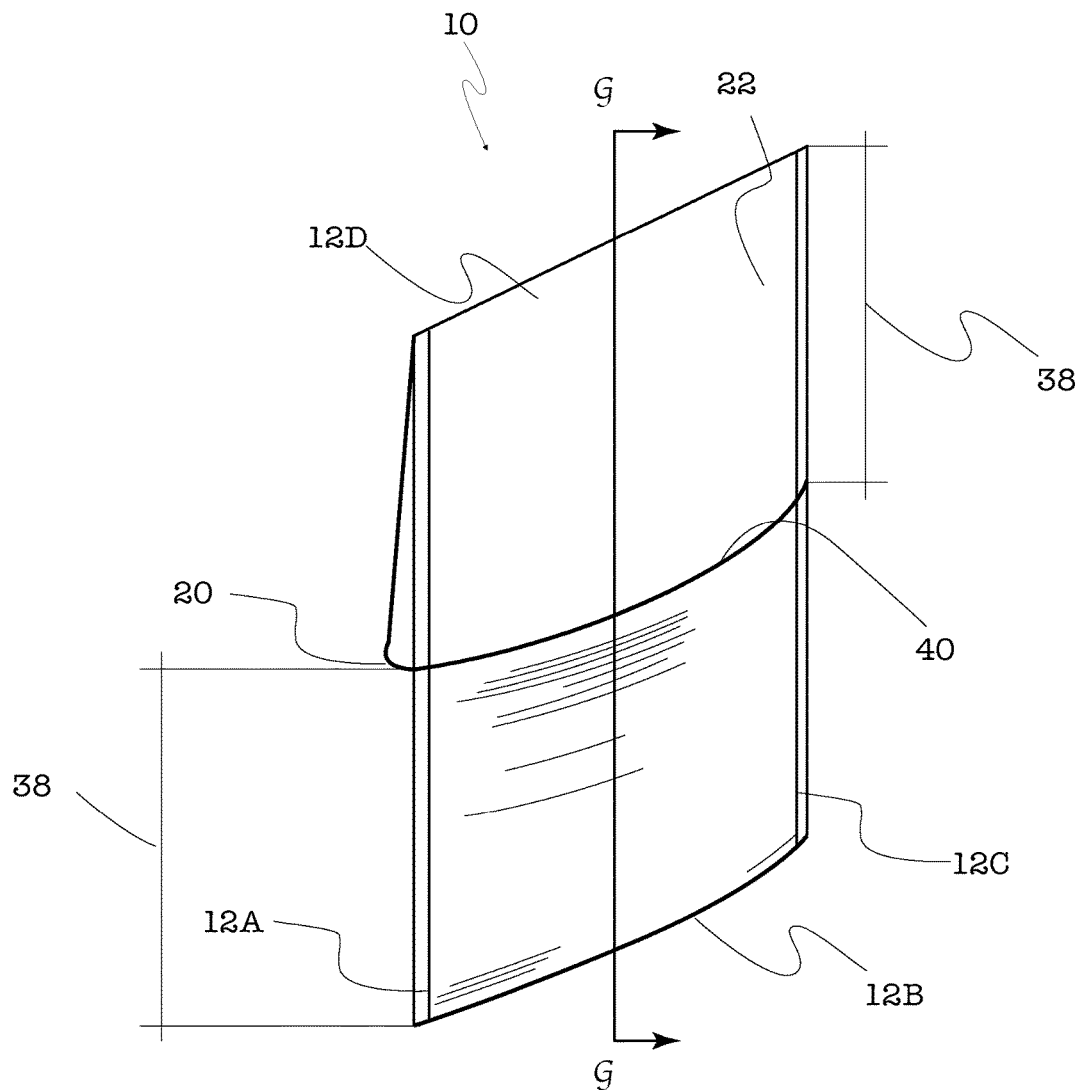
FIG. 14 is a perspective view of the animal waste bag according to at least one embodiment of the present invention.
Figure 15:
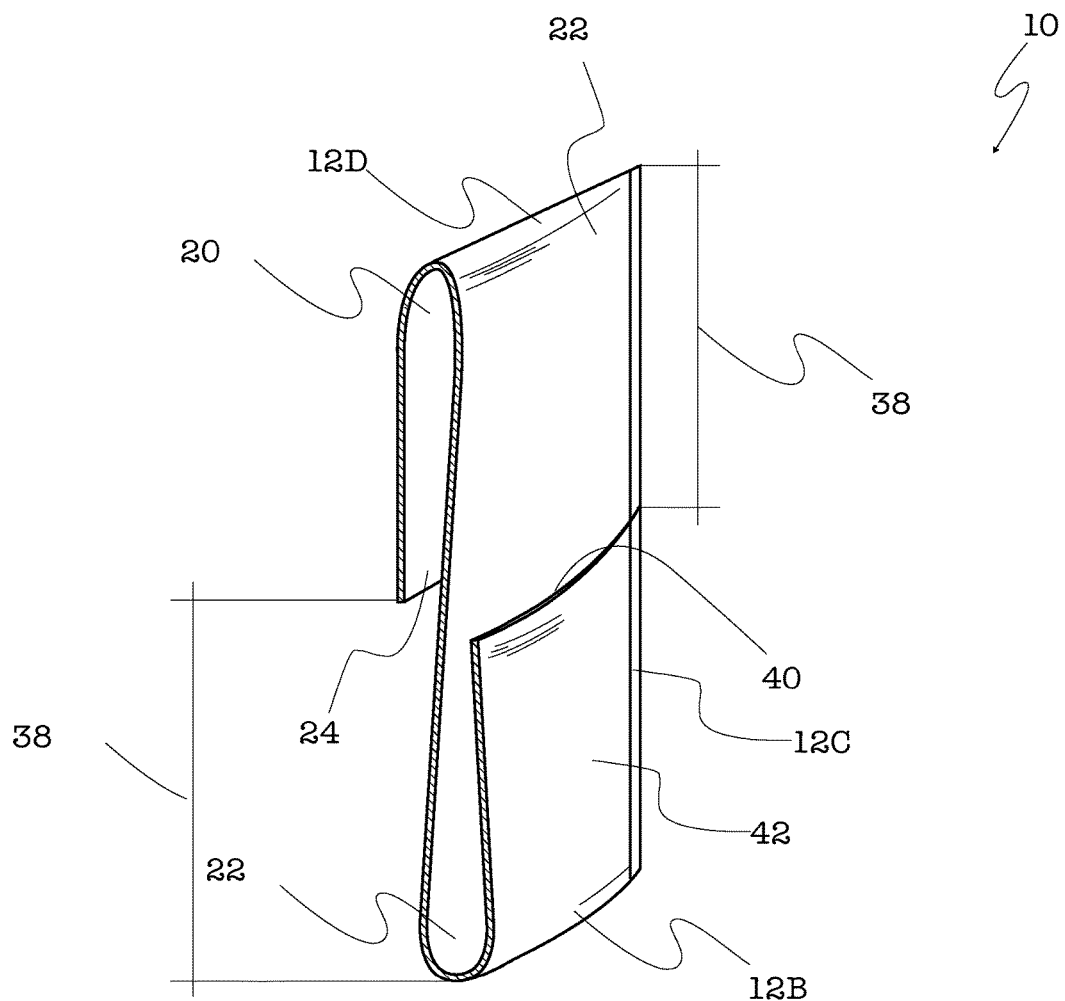
FIG. 15 is a cross-sectional view of the animal waste bag according to at least one embodiment of the present invention.

FIGS. 14-15 illustrate the animal waste bag in accordance with at least one embodiment, in which the respective pouches are formed in accordance with the pouch features illustrated in FIGS. 9-10, except that the central pouch opening and the additional pouch opening are located on opposing sides of the first wall. The structure and operation of such embodiments are believed to be apparent from the foregoing discussion, and are not described further here for the sake of brevity.

FIGS. 16-18 illustrate the animal waste bag in accordance with at least one embodiment, in which the respective pouches are formed such that their openings are located at different edges of the animal waste bag. For example, as illustrated, the additional pouch is formed such that its opening is located at the left edge of the animal waste bag. The structure and operation of such embodiments are otherwise consistent with embodiments discussed herein, are believed to be apparent from the foregoing discussion, and are not described further here for the sake of brevity.

Moreover, although the respective openings are shown herein as extending the entirety of an edge, such openings may extend over only part of the edge. Accordingly, the animal waste material may be further secured after retrieval.

The embodiments described in detail above are considered novel over the prior art of record and are considered critical to the operation of at least one aspect of the invention and to the achievement of the objectives of the invention. The words used in this specification to describe the exemplary embodiments are to be understood not only in the sense of their commonly defined meanings, but also to include any special definition with regard to structure, material or acts that would be understood by one of ordinary skilled in the art to apply in the context of the entire disclosure.

The definitions of the words or drawing elements described herein are meant to include not only the combination of elements which are literally set forth, but all equivalent structures, materials or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim without departing from the scope of the invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. An animal waste bag, comprising:
   a first pouch;
   one or more additional pouches formed exterior to the first pouch such that each additional pouch is successively exterior to the preceding pouch, wherein the first and additional pouches are configured to successively retrieve and contain animal waste via their respective successive inversion;
   a first wall and a second wall joined at respective peripheries so as to form the first pouch; and
   a third wall joined to the second wall at respective peripheries so as to form a second pouch of the one or more additional pouches, wherein the first pouch includes a first opened end and a first closed end opposite the first opened end, wherein the second wall extends from the first opened end to the first closed end.

2. The animal waste bag of claim 1, wherein at least one of the first wall, second wall, and third wall has a different height than at least another one of the first wall, second wall, and third wall.

3. The animal waste bag of claim 1, wherein a first pouch opening is inverted with respect to a second pouch opening.

4. The animal waste bag of claim 1, wherein the first pouch has a first pouch opening, wherein the second pouch has a second pouch opening, wherein the first pouch opening and the second pouch opening are located on opposite sides of the second wall.

5. The animal waste bag of claim 1, further comprising:
   a fourth wall joined to the first wall at respective peripheries so as to form a third pouch of the one or more additional pouches.

6. The animal waste bag of claim 5, wherein the fourth wall is shorter than the first wall.

7. The animal waste bag of claim 1, wherein a first pouch opening is inverted with respect to an opening of at least one of the one or more additional pouches.

8. The animal waste bag of claim 5, wherein the first pouch has a first pouch opening, wherein the third pouch has a third pouch opening, wherein the first pouch opening and the third pouch opening are located on opposite sides of the first wall.

9. The animal waste bag of claim 1, wherein each pouch is reversible.

10. The animal waste bag of claim 1, further comprising:
    a further wall joined to a wall forming one of the one or more additional pouches at respective peripheries so as to thereby form a further pouch, wherein the further wall is shorter than the wall.

11. The animal waste bag of claim 10, wherein each pouch is reversible.

12. The animal waste bag of claim 1, wherein the walls include respective handles.

13. The animal waste bag of claim 1, wherein the third wall includes an adhesive strip located on an exterior surface of the third wall proximate to and substantially parallel to an opening of the second pouch.

14. The animal waste bag of claim 1, wherein each additional pouch has a unique height differential from the first pouch.

15. A method for retrieving animal waste using an animal waste bag, wherein the animal waste bag comprises a first pouch; and one or more additional pouches formed exterior to the first pouch such that each additional pouch is successively exterior to the preceding pouch, the method comprising: retrieving and containing a first animal waste within one of the additional pouches via inversion of the additional pouch; and retrieving and containing second animal waste within the first pouch via inversion of the first pouch, wherein the one of the additional pouches remains inverted during inversion of the first pouch;

a first wall and a second wall joined at respective peripheries so as to form the first pouch;

and a third wall joined to the second wall at respective peripheries so as to form a second pouch of the one or more additional pouches, wherein the first pouch includes a first opened end and a first closed end opposite the first opened end, wherein the second wall extends from the first opened end to the first closed end.

16. The animal waste bag of claim 1, wherein the second pouch includes a second opened end and a second closed end opposite the second opened end, wherein the second wall extends from the second opened end to the second closed end.

17. The animal waste bag of claim 16, wherein the first and second opened ends face in the same direction.

18. The animal waste bag of claim 16, wherein the first and second opened ends face in different directions.

19. The animal waste bag of claim 16, wherein the first and second opened ends face in opposite directions.

20. An animal waste bag, comprising:

a first pouch; and one or more additional pouches formed exterior to the first pouch such that each additional pouch is successively exterior to the preceding pouch, wherein the first and additional pouches are configured to successively retrieve and contain animal waste via their respective successive inversion, wherein the first pouch has a first opened end, wherein at least one of the one or more additional pouches has a second opened end; and a first wall and a second wall joined at respective peripheries so as to form the first pouch; and a third wall joined to the second wall at respective peripheries so as to form a second pouch of the one or more additional pouches, wherein the first pouch includes a first opened end and a first closed end opposite the first opened end, wherein the second wall extends from the first opened end to the first closed end, wherein the first wall has a height that is different than a height of the second wall.

* * * * *

UNITED STATES PATENT AND TRADEMARK OFFICE
CERTIFICATE OF CORRECTION

Figure 3G:
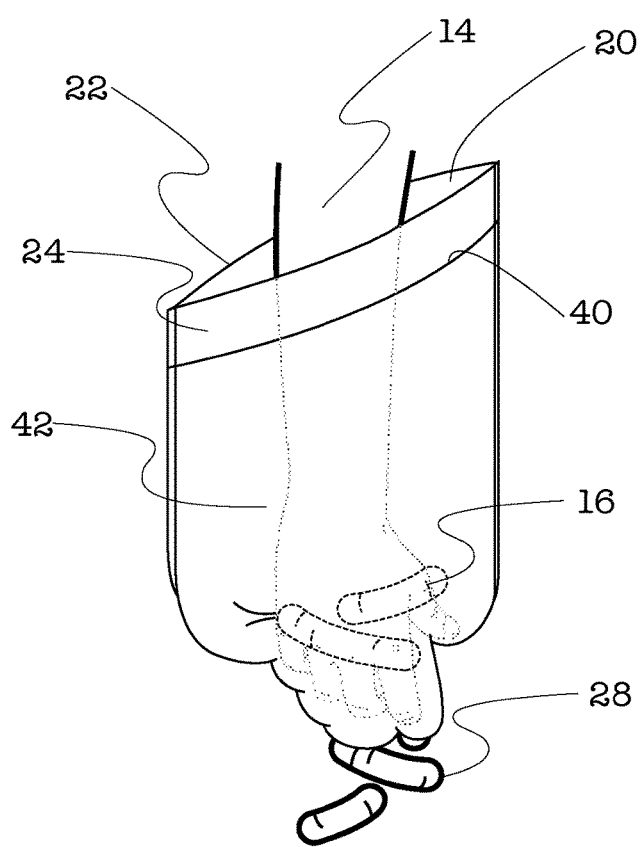
Figure 3H:
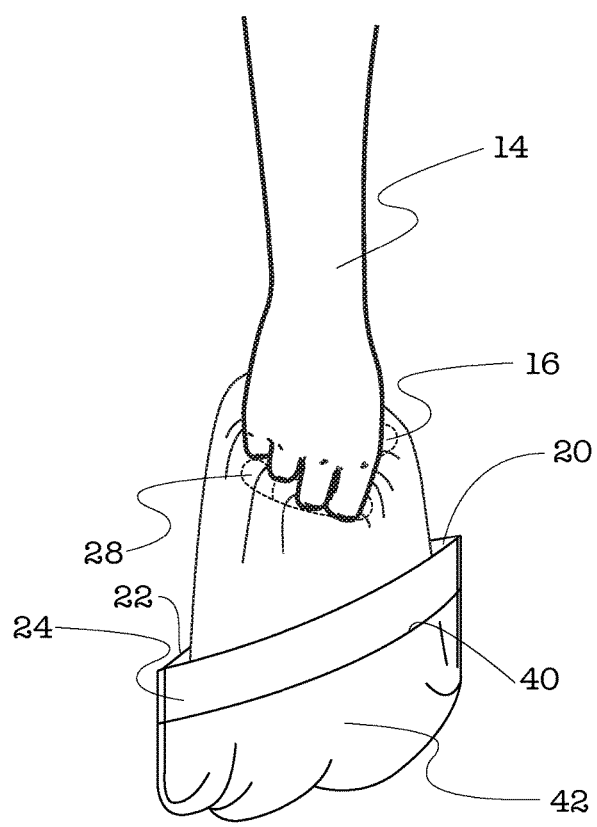
Figure 31:
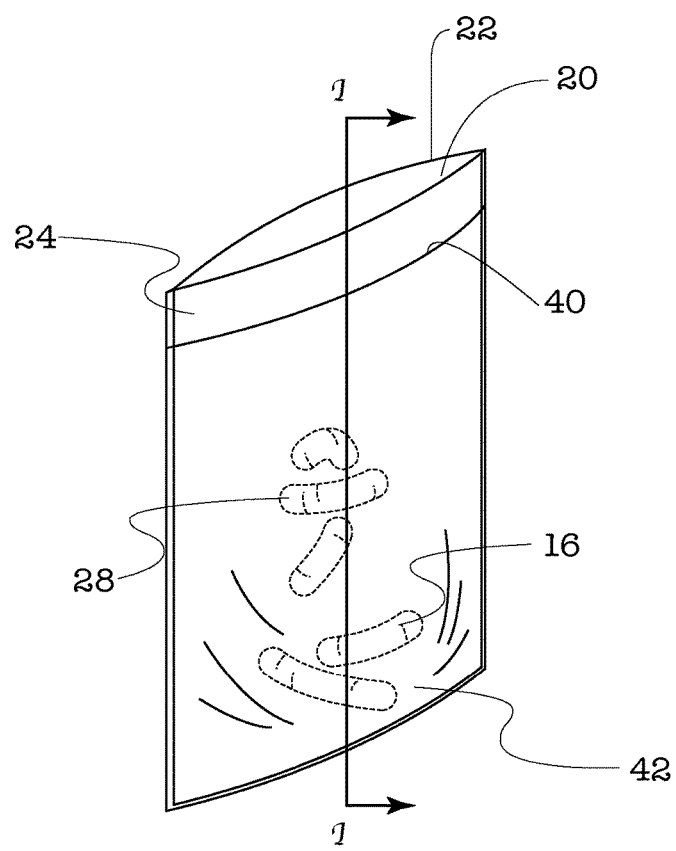
Figure 3J:
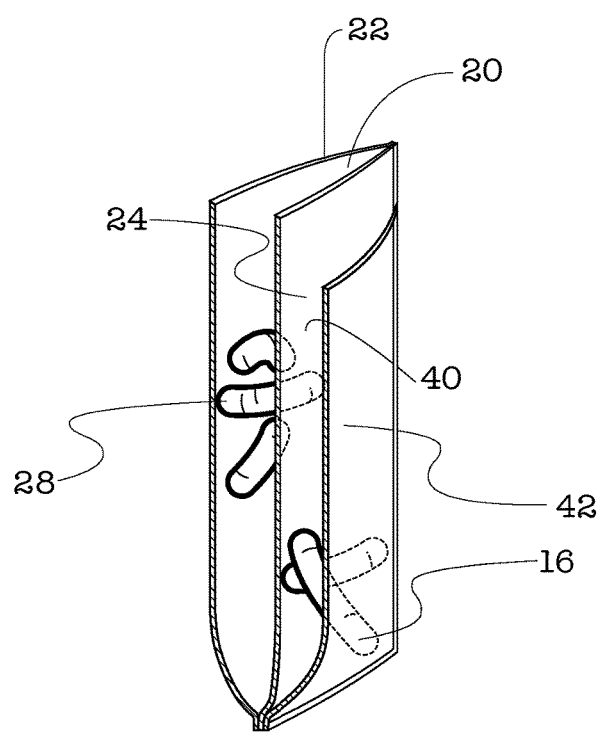

PATENT NO. : 10,405,522 B2
APPLICATION NO. : 16/051153
DATED : September 10, 2019
INVENTOR(S) : Mun Jen Ng It is certified that error appears in the above-identified patent and that said Letters Patent is hereby corrected as shown below:

In the Drawings
Sheet 6 of 27, in Figure 3D, replace reference number "22" with --24--
Sheet 6 of 27, in Figure 3D, replace reference number "24" with --22--
Sheet 7 of 27, in Figure 3E, replace reference number "22" with --24--
Sheet 7 of 27, in Figure 3E, replace reference number "24" with --22--
Sheet 8 of 27, in Figure 3F, replace reference number "22" with --24--
Sheet 8 of 27, in Figure 3F, replace reference number "24" with --22--
Sheet 9 of 27, in Figure 3G, replace reference number "22" with --24--
Sheet 9 of 27, in Figure 3G, replace reference number "24" with --22--
Sheet 10 of 27, in Figure 3H, replace reference number "22" with --24--
Sheet 10 of 27, in Figure 3H, replace reference number "24" with --22--
Sheet 11 of 27, in Figure 3I, replace reference number "22" with --24--
Sheet 11 of 27, in Figure 3I, replace reference number "24" with --22--
Sheet 11 of 27, in Figure 3I, delete reference number "42"
Sheet 11 of 27, in Figure 3I, amend the line indicating the upper edge of the third wall 42 to be correctly dashed instead of solid
Sheet 12 of 27, in Figure 3J, replace reference number "22" with --24--
Sheet 12 of 27, in Figure 3J, replace reference number "24" with --22--
Sheet 12 of 27, in Figure 3J, amend the third wall to be correctly located between the first and second walls
The above-mentioned corrected figures are attached as replacement sheets In the Specification
Column 4, Line 58, change "second" to --first--
Column 5, Line 34, change "second" to --first--
Column 5, Line 36, change "second" to --first--

Signed and Sealed this
Twelfth Day of January, 2021

Andrei Iancu
*Director of the United States Patent and Trademark Office*

SECTION H-H

SECTION 1-1